United States Patent [19]
Van Meerbergen et al.

[11] Patent Number: 5,613,152
[45] Date of Patent: Mar. 18, 1997

[54] DATA PROCESSOR WITH OPERATION UNITS EXECUTING DYADIC AND MONADIC OPERATIONS SHARING GROUPS OF REGISTER FILES WITH ONE OF THE UNITS EXCLUSIVELY ACCESSING ONE OF THE REGISTER FILES

[75] Inventors: Jozef L. Van Meerbergen; Hendricus A. Hilderink; Paul E. R. Lippens; Antoine Delaruelle, all of Eindhoven, Netherlands

[73] Assignee: U.S. Philips Corporation, New York, N.Y.

[21] Appl. No.: 572,187

[22] Filed: Dec. 13, 1995

Related U.S. Application Data

[63] Continuation of Ser. No. 136,799, Oct. 14, 1993, abandoned.

[30] Foreign Application Priority Data

Oct. 19, 1992 [EP] European Pat. Off. .............. 92203192

[51] Int. Cl.[6] .......................... G06F 15/00; G06F 12/00
[52] U.S. Cl. .............................. 395/800; 395/476
[58] Field of Search ................................. 395/800, 476, 395/474, 821, 200.08

[56] References Cited

U.S. PATENT DOCUMENTS

| | | | |
|---|---|---|---|
| 3,978,452 | 8/1976 | Barton et al. | 395/775 |
| 4,293,907 | 10/1981 | Huang et al. | 395/375 |
| 4,348,720 | 9/1982 | Blahut et al. | 395/425 |
| 4,388,685 | 6/1983 | Kotok et al. | 395/400 |
| 4,674,034 | 6/1987 | Iwashita et al. | 395/425 |
| 4,766,566 | 8/1988 | Chuang | 395/375 |
| 4,835,733 | 5/1989 | Powell | 395/400 |
| 4,980,819 | 12/1990 | Cushing et al. | 395/375 |
| 5,095,523 | 3/1992 | Delarvelle et al. | 395/800 |
| 5,241,635 | 8/1993 | Papadopoulos et al. | 395/375 |
| 5,301,340 | 4/1994 | Cook | 395/800 |

FOREIGN PATENT DOCUMENTS

| | | |
|---|---|---|
| 0085435 | 8/1983 | European Pat. Off. . |
| 0359192 | 3/1990 | European Pat. Off. . |

OTHER PUBLICATIONS

Steven et l., "iHARP: a multiple instruction issue processor", IEE Proc. E. vol. 139, No. 5, Sep. 1992, pp. 439–449.

Woudsma et al., "Piramid: An Architecture—Driven Silicon Compiler for Complex DSP Applications", 1990 IEEE International Symposium on Circuits and Systems, May 1–3, 1990, New Orleans, Louisianna, pp. 2596–2600.

*Primary Examiner*—Matthew M. Kim
*Attorney, Agent, or Firm*—Anne E. Barschall

[57] ABSTRACT

A data processor of modular architecture comprises a plurality of operation units, each serving to implement specific functionalities as required by the instruction set that determines the processor's operation. Register files for several ones among the operation units are merged. At least one of the register files is exclusively assigned to one of the operation units. At the expense of only a marginal increase, if any, of the number of instruction cycles, smaller register file areas in an IC embodiment, less register file control circuitry and simpler microcode words are obtained.

5 Claims, 2 Drawing Sheets

DATA PROCESSOR WITH OPERATION UNITS EXECUTING DYADIC AND MONADIC OPERATIONS SHARING GROUPS OF REGISTER FILES WITH ONE OF THE UNITS EXCLUSIVELY ACCESSING ONE OF THE REGISTER FILES

This is a continuation of application Ser. No. 08/136,799, filed on Oct. 14, 1993, now abandoned.

FIELD OF THE INVENTION

The invention relates to a data processor comprising a data processing means with a first plurality of operation units, each respective one thereof for receiving respective data and executing a respective one of data processing operations on the respective data. The data processor further comprises a register file means being coupled to the data processing means and being operative to store data prior to supplying the data to the data processing means, the register file means comprising a second plurality of register files. Each particular one of the operation units is coupled to a particular one of the register files.

BACKGROUND ART

A data processor is a well known device that forms the heart of almost any computer. A data processor operates on input data to create output data by executing a pre-specified algorithm. Typically, a processor functionally contains one or more of the following operation units: an arithmetic unit (e.g., ALU) to perform additions, subtractions, shifting, a multiplier (MUL) to multiply two data items, a random-access memory (RAM) to read and to write data, a read-only-memory (ROM) to only read data, an address calculation unit to provide addresses for access of the memories, or an application-specific unit (ASU). An ASU is a dedicated unit, typically used to execute operations that do not fit in with the instruction set of another operation unit within the restricted number of instruction cycles specified for that other operation unit. Mapping the surplus operations onto an ASU then may be more efficient than increasing the number of instruction cycles for the other operation unit or providing an additional operation unit of the same kind as the other operation unit.

A processor as introduced in the preamble above is disclosed in "PIRAMID: An Architecture-Driven Silicon Compiler for Complex DSP Applications", by R. Woudsma, F. P. M. Beenker, J. L. Van Meerbergen and C. Niessen, 1990 IEEE International Symposium on Circuits and Systems, New Orleans, La., U.S.A., May 1–3, 1990, pp. 2596–2600. FIGS. 2 and 3 of this prior art document show a modular architecture for a processor. The architecture is automatically generated by a silicon compiler (PIRAMID) on the basis of a functional specification for the processor. Unlike a conventional data processor that is frozen in silicon and that therefore must be configured to be general purpose, the processor generated by PIRAMID is optimized to the application envisaged.

The prior art document's FIG. 2 illustrates the processor's modular architecture having a plurality of execution units interconnected by data buses and controlled via a microcode program stored in a controller. The general structure of an execution unit is shown in the document's FIG. 3. An execution unit is a functional and physical entity that performs one or more operations required to implement the algorithm. Each execution unit therefore comprises an operation unit, of the kind discussed above to actually perform the operation, and a register file to store the input data used as operands by the operation unit and to supply the input data to the operation unit when needed.

Generally, the register file comprises an "A"-register file section and a "B"-register file section. The "A"-register file section supplies the "A"-operand and the "B"-register file section supplies the "B"-operand to the operation unit. The operation unit thereupon operates on both operands. For instance, the operation unit may interpret both "A"- and "B"-operands as data to be subjected to a logic or mathematical operation. If the operation unit includes a RAM, it receives the "A"-operand as data to be stored at an address specified by the "B"-operand. Operations involving both "A"- and "B"-operands are called "dyadic" operations, whereas an operation involving only a single operand is called a "monadic" operation. As an example of the latter, an operation unit that includes a ROM only needs a single operand, namely a ROM's address. The ROM register file therefore only comprises an "A"-register file section.

A register file is a dual-ported device that is operative to execute a read operation and a write operation in a single instruction cycle. The register file serves as a fast foreground memory connected to the operation unit. A background memory is a single-ported device and can perform only one read operation or one write operation in a single instruction cycle. The background memory therefore is slow as compared to the foreground memory and is treated as an operation unit of a separate execution unit (e.g., RAM, ROM). Register files are addressed by the controller via an instruction register, whereas the background memory is addressed via address calculation units implemented in another execution unit. Note that each individual execution unit has its own register file.

OBJECT OF THE INVENTION

Although the PIRAMID approach optimizes processor architecture to a large degree, the modularity may still lead to relatively large sized processor systems and a relatively inefficient use of the processor's capabilities. This may be due to, among other things, the execution units being optimized individually without taking into account functional inter-dependencies among the execution units for the specific application envisaged.

It therefore is an object of the invention to provide a data processor of the kind mentioned in the preamble that is smaller and more efficient than the prior art and that has at least the same capabilities as the prior art processor.

SUMMARY OF THE INVENTION

To achieve these goals, the invention provides a data processor comprising data processing means with a first plurality of operation units, each respective one thereof for receiving respective data and executing a respective one of data processing operations on the respective data. The data processor further comprises register file means being coupled to the data processing means and being operative to store data prior to supplying the data to the data processing means. The register file means comprises a second plurality of register files. Each particular one of the operation units is coupled to a particular one of the register files. According to the invention, at least one of the register files is coupled to at least two of the operation units.

In the invention, some of the operation units share the same register file, whereas other operation units share another register file or have separate register files not shared by other operation units. The invention is based on the insight that the register files of operation units have idle register locations for some time upon having supplied the locations' contents (i.e., operands) to the associated operation unit, and on the insight that a same operand may be used in several operation units simultaneously or dispersed in time. Accordingly, the register files for two or more of the operation units may physically and functionally be merged with one another, depending on the application of the processor.

For example, in iterative operations a first operation unit and a second operation unit receive the same operand(s) from a shared register file. The first unit processes the operand(s) in a predetermined manner to supply the processing result to a third operation unit, whereas the second unit calculates on the basis of the received operand(s) the subsequent operand(s) to be supplied to the first unit in a next iteration.

Advantages are manifold. The shared register file is smaller than a collection of separately employed register files. The use of shared register locations reduces the actual required register storage capability. Peripheral circuitry to implement the register's I/O functionality, such as the instruction register, is shared as well, leading to an additional reduction in size.

The microcode's data fields that relate to addresses of locations of merged registers may inherently be longer because the address space is increased for merged registers, but a single address data field now comes instead of the two or more address data fields of the prior art. Consequently, the width of a microcode word is reduced, and a smaller controller can be used. Rescheduling of the microcode instructions may be needed, as well as slightly extending the set of instructions. However, this may be well worthwhile in view of the advantages gained.

Further, a plurality of small circuit blocks usually requires a larger substrate area in an integrated circuit embodiment than a single larger circuit block with the same functionality. This is due to the fact that the circuit block's elements typically do not completely occupy the substrate area that is to be reserved for the circuit block in view of the safety margins and resolution in the IC technology used. In addition, in a computer-aided design environment the lay-out of a circuitry building block for use on a chip is automatically generated on the basis of specifications of a parameter format. Typically, the generated lay-out for a building block is comprised in a rectangle to be reserved on the chip's area in view of simple interconnection leads to be added later on. The fraction of the chip's not-occupied space increases for an increasing number of rectangles. Moreover, the automatic generation of a lay-out may be optimized for a particular parameter value or for a range of parameter values, e.g., for memory size or memory capacity. Beyond the optimized range the associated lay-out may be using the chip's area less efficiently. Merging the same functionalities of a plurality of blocks within a single block or a few blocks therefore reduces the size of not-occupied areas in proportion.

In the processor of the invention, the first plurality of operation units may be non-uniform. That is, operation units may have mutually different functionalities and, therefore, non-uniform architectures. Groupwise sharing of register files among the different operation units is advantageous for the processor as a whole.

In a further embodiment of the invention, a first one of the register files is coupled to a first one and a second one of the operation units, the first operation unit being operative to execute a dyadic operation and the second operation unit being operative to execute a monadic operation. Typically, the first operation unit comprises a memory (e.g., a RAM) and the second operation unit comprises an address calculating unit (ACU), which is advantageous, for instance, when the addresses are to be calculated iteratively.

Note that conventional dam processors, other than those having a modular architecture such as the PIRAMID-processor mentioned above, may comprise a single oversized register file for all intended functionalities combined. The invention, however, concerns a dedicated data processor, wherein the modular approach is locally slightly modified to optimize for size, speed and cost. Specially in an integrated circuit embodiment, the invention provides many attractive features.

BRIEF DESCRIPTION OF THE DRAWING

The invention is explained hereinafter by way of example and with reference to the accompanying drawing, wherein.

DETAILED DESCRIPTION OF THE EMBODIMENTS

Processor Architecture

Figure 1:
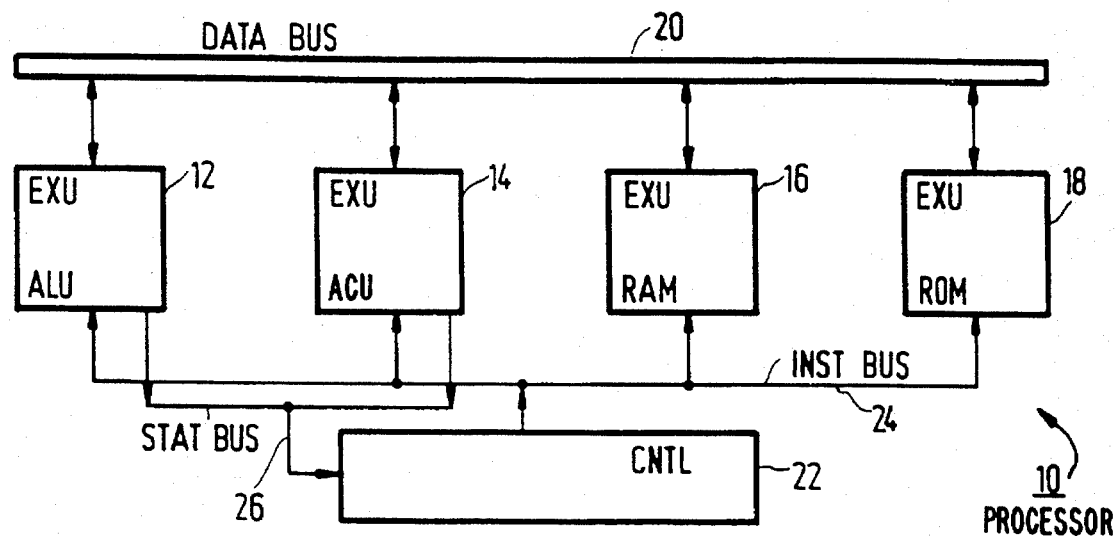
FIG. 1 illustrates an example for the modular architecture of a data processor.

FIG. 1 gives a schematic example of the architecture of a processor 10. Processor 10 includes, among other things, execution units 12, 14, 16 and 18 that are interconnected via one or more data buses 20 for data communication among the execution units and whose operation is controlled by a controller 22. Controller 22 supplies instructions to execution units 12-18 via an instruction bus 24, possibly depending on status information, such as flags, received from execution units 12 and 14 via a status bus 26, in order to enable data-dependent processing such as branching. Execution unit 12 implements an arithmetic unit functionality (ALU). Execution unit 14 comprises an address calculation unit (ACU) to generate optimized address sequences for memories, such as for execution unit 16 that includes a RAM and execution unit 18 that includes a ROM.

Prior Art Execution Unit

Figure 2:
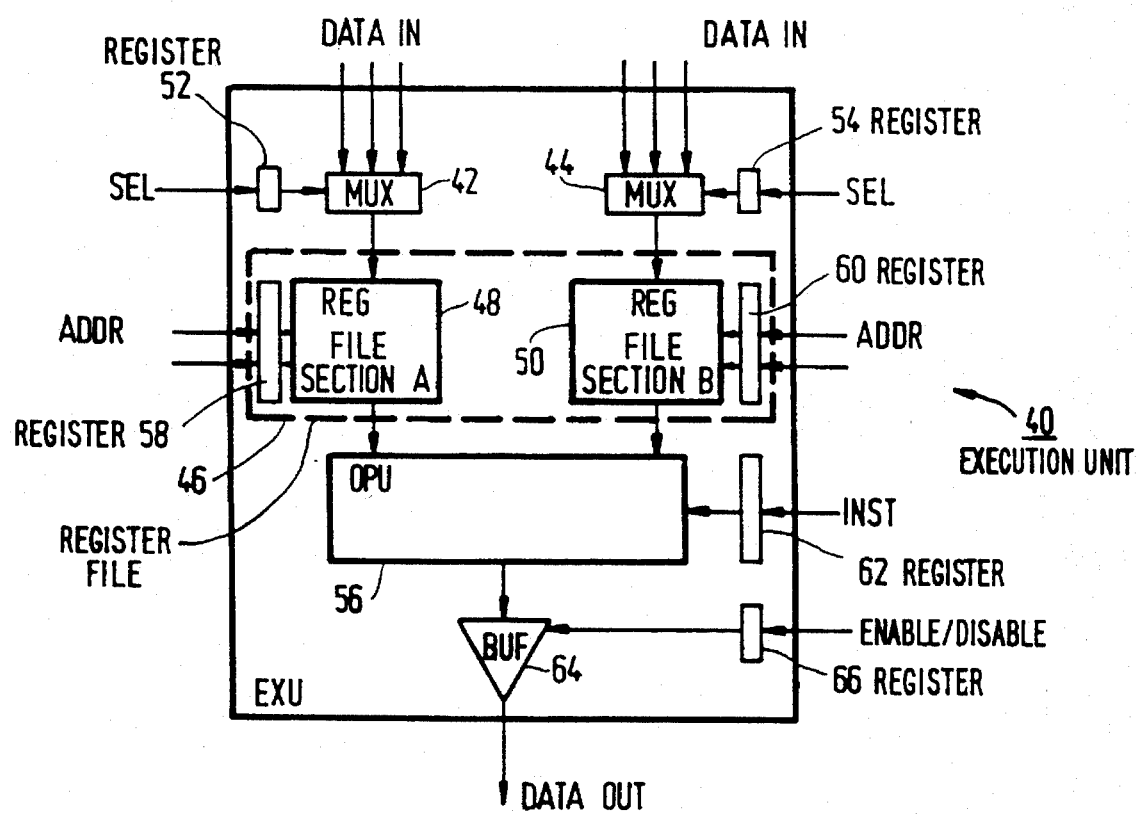
FIG. 2 gives the prior art building block to implement the structure of FIG. 1.

FIG. 2 shows a block diagram of a typical execution unit 40 in the prior art. Execution unit 40 is provided with multiplexers 42 and 44 at its input for time multiplexing within an application. Multiplexers 42 and 44 selectively couple data lines (not shown) of bus 20 to a register file 46 that includes an "A"-operand section 48 and a "B"-operand section 50. Multiplexers 42 and 44 operate under control of controller 22 that supplies appropriate selection signals SEL via instruction registers 52 and 54. Register file 46 stores the data, received from multiplexers 42 and 44, and transfers the data to an operation unit 56 that receives the data as operands. Sections 48 and 50 receive read and write addresses (ADDR) from controller 22 via instruction registers 58 and 60. Operation unit 56 executes an operation on the data received from register file 46 under control of an instruction received from controller 22 via instruction register 62. The outcome of this operation is supplied to data bus 20 via a buffer 64 that is selectively enabled or disabled (E/D) by controller 22 via an instruction register 66.

When the ROM functionality is implemented in execution unit 40, multiplexer 44, section 50 and instruction registers 54 and 60 are absent.

Building Block of the Invention

Figure 3:
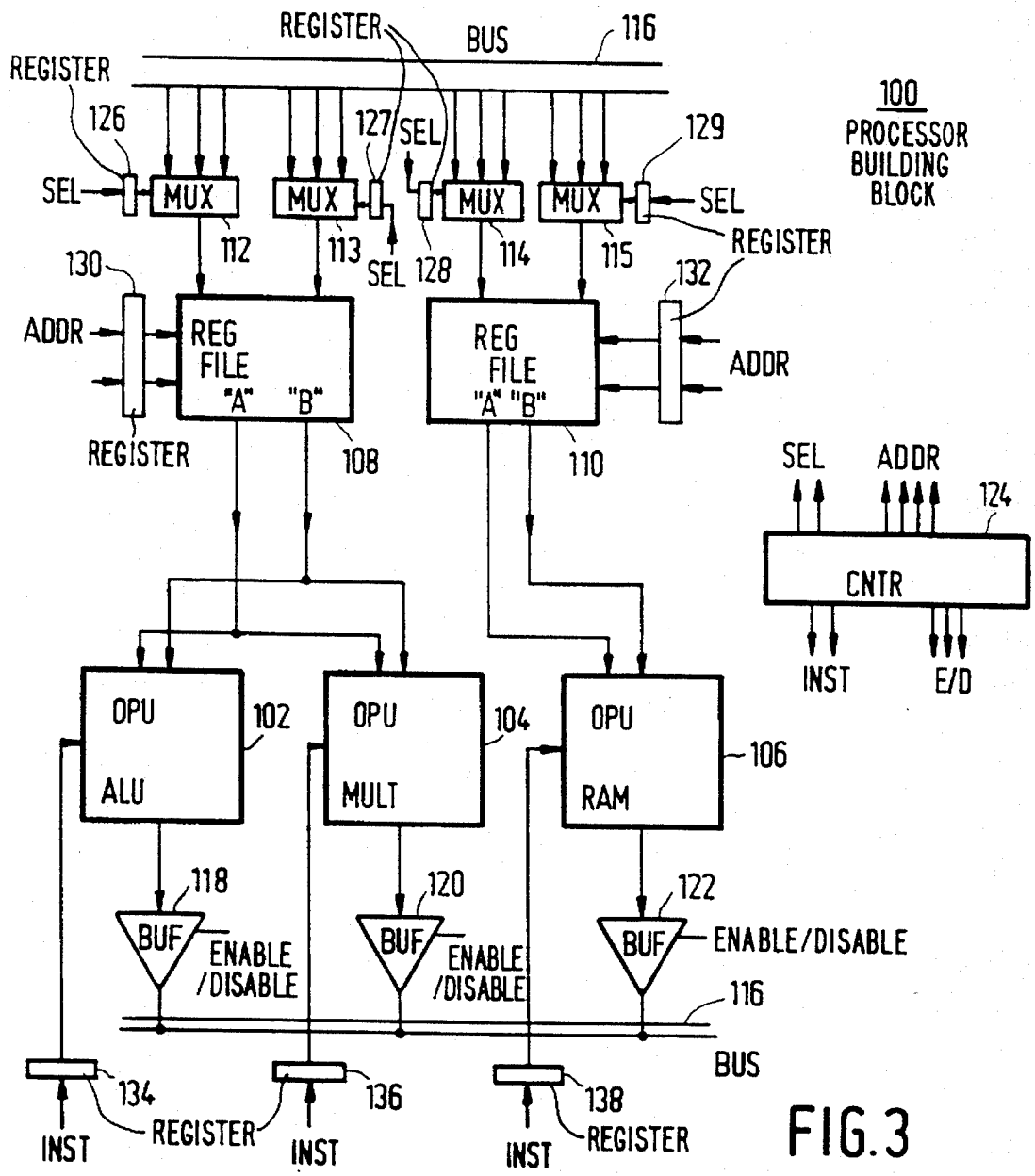
FIG. 3 shows an example of a building block of the invention to implement the data processor of FIG. 1.

FIG. 3 schematically illustrates a building block according to the invention to implement the architecture of processor 10 in FIG. 1. Processor building block 100 comprises operation units 102, 104 and 106 that receive their input dam from register files 108 and 110. Register file 108 receives the input data via multiplexers 112 and 113, and register file 110 receives the input data via multiplexers 114 and 115. Multiplexers 112-115 are connected to a bus 116. The results provided by operation units 102, 104 and 106 are supplied to bus 116 via buffers 118, 120 and 122, respectively. Multiplexers 112-115 are controlled by a controller 124 via instruction registers 126, 127, 128 and 129 through selection signals SEL. Addresses (ADDR) are furnished to register files 108 and 110 by controller 124 via instruction registers 130 and 132. The modes of operation of operation units 102, 104 and 106 are determined by controller 124 that supplies instructions (INST) via instruction registers 134, 136 and 138. Buffers 118, 120 and 122 are selectively enabled and disabled (E/D) via controller 124.

Note that the block of FIG. 3 is adapted to be used as a higher level execution unit for collaborating with other execution units of the same kind or of the kind shown in FIG. 2. Also note that, where throughout the drawings single lines are drawn to indicate inputs for receiving data or other signals, or to indicate interconnections, these lines may stand for buses several signal leads wide.

In the example shown, register file 108 is used to selectively provide operands to operation units 102 and 104 under control of controller 124, whereas register file 110 supplies operation unit 106 with operands. It will be clear to the skilled person that register file 108 may be comprised of, say, two or more single-input register files (not shown) ganged in parallel, for supplying respective operands to two or more respective ones of the operation units of which only 102, 104 and 106 are drawn. It will also be clear that in general further multiplexers (not shown) can be inserted between the outputs of at least some of the register files on the one hand and the inputs of some of the operation units on the other hand for scheduling appropriate distribution of the operands.

Operation units 102-106 are assumed to execute dyadic instructions in this example. As compared with the prior art, the register files for operation units 102 and 104 now are merged to provide a single register file.

Typical Example

Figure 4:
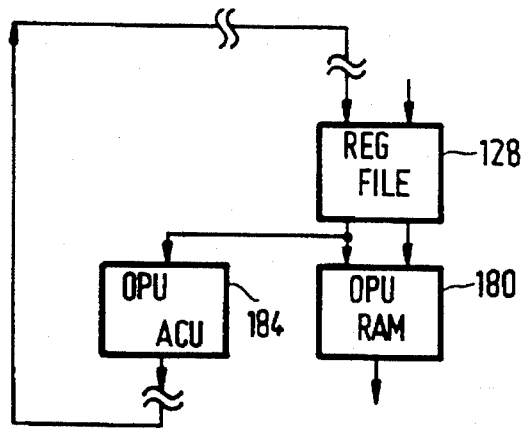
FIG. 4 discloses a typical combination of operation units sharing the same register file.

FIG. 4 illustrates only the essentials for a typical example of a shared register file. Control features and I/O features are assumed to be similar to those of FIG. 3. A RAM 180 stores dam received via register file 182 at addresses received via register file 182 and provides data to bus 116. An address calculating unit (ACU) 184 receives the same address as does RAM 180 for iteratively calculating the next address. The next address then is supplied to bus 116 and routed to register file 182 again. The interrupted interconnections in FIG. 4 serve as reminders of the control and I/O features, here left out for brevity.

Whether or not the register files for several of the operation units can be merged together depends on the actual operations to be executed. In what manner the instruction set affects the merging of register files is explained as follows. In order to come up with a merging strategy, the designer may take as a basis an initial schedule for the operation units to indicate which one of the operation units is active in which one of the instruction cycles. The register files of operation units that are not active simultaneously, i.e., during the same instruction cycles, could be merged. However, such situations are rare. More likely, there will be operation units that for only a few instruction cycles will be active simultaneously. Merging the register files then still can be accomplished but at the expense of introducing additional instruction cycles to avoid conflicts. A slightly increased number of instruction cycles may well pay for the advantage of merged register files. The designer could also consider operands used in more than one operation unit either simultaneously or in different instruction cycles. Such operand then requires a single register location only, which possibly will be occupied for a prolonged number of instruction cycles. It will be clear to the person skilled in the art that the saving of hardware will mainly depend on the program for whose execution the processor in the invention is to be created. It has been found that for an integrated circuit embodiment of a processor in the invention the saving of substrate area typically is in the order of 15%-20%.

We claim:

1. A data processor, comprising:

data processing means with a first plurality of operation units, coupled in parallel and having outputs selectively coupled to inputs, each respective one thereof for receiving respective data and executing a respective one of data processing operations on the respective data;

register file means being coupled to the data processing means and being operative to store data prior to supplying the data to the data processing means, the register file means comprising a plurality of physically separate register files; and wherein each particular one of the operation units is coupled to a particular one of the register files;

wherein at least a first one of the register files is connected to respective inputs of first and second ones of the operation units; and wherein at least a second one of the register files is exclusively connected to an output of a third one of the operation units.

2. The processor of claim 1, wherein the first plurality of operation units are mutually non-uniform.

3. The processor of claim 1, wherein the first operation unit is operative to execute a dyadic operation and the second operation unit is operative to execute a monadic operation.

4. The processor of claim 3, wherein the first operation unit comprises a memory and the second operation unit comprises an address calculating unit.

5. The processor of claim 1 implemented in an integrated circuit chip.

* * * * *